April 18, 1961  E. R. WORKMAN  2,980,127
VALVE DRIVE SYSTEM
Filed July 1, 1957
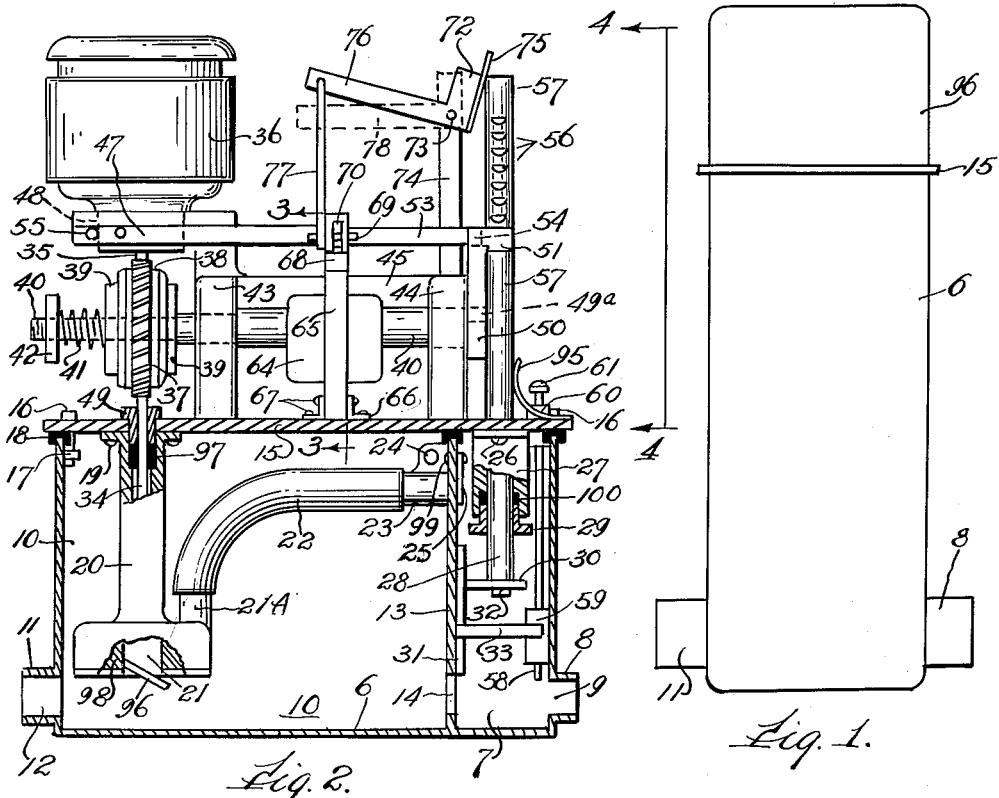
Fig. 1.
Fig. 2.
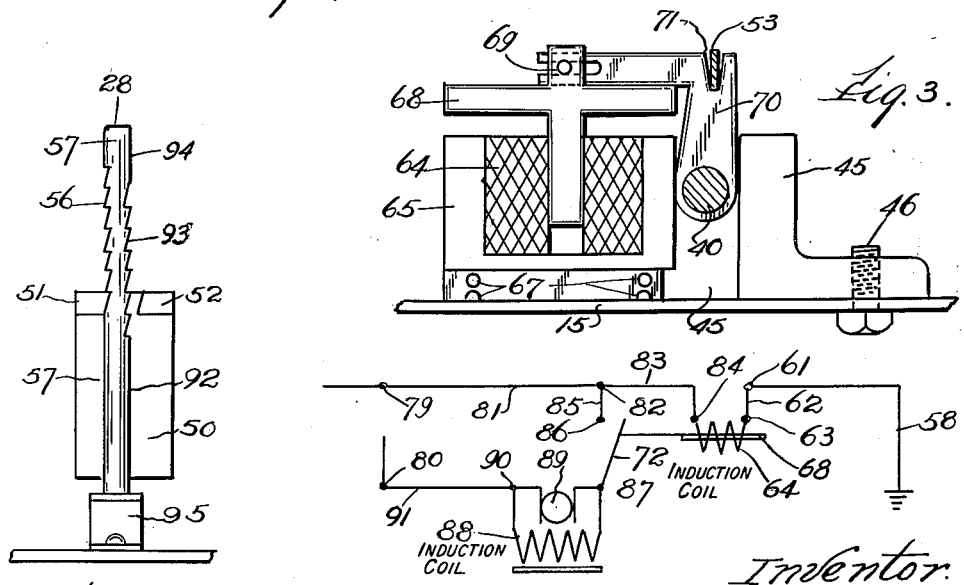
Fig. 3.
Fig. 4.
Fig. 5.
Inventor:
Ernest R. Workman

United States Patent Office 2,980,127
Patented Apr. 18, 1961

---

2,980,127

VALVE DRIVE SYSTEM

Ernest R. Workman, 3334 W. 63rd St., Chicago, Ill.

Filed July 1, 1957, Ser. No. 669,160

2 Claims. (Cl. 137—115)

This invention relates to a valve drive system having mechanism and controls whereby a valve gate is automatically closed and opened as steps in an operative cycle of a pump and wherein said cycle of operation is initiated and terminated by electrical circuit components, the electrical components being responsive to the rise, or fall, of a fluid level.

A principal object of the invention is the provision of a pump, a valve gate and controls being incorporated therewith and arranged to produce a single unit that may be connected with a drainage disposal pipe for preventing the flooding of an area drained by the pipe due to a reverse flow of fluid in the pipe as the result of an excessive rise of the fluid level in a drainage disposal system.

Another object of the invention is to provide a pump compartment in the unit for collecting drainage from a drained area during times of such reverse flow of fluid in pipes and to provide the pump with intake and discharge openings, the pump forcing the collected drainage to by-pass the closed gate against a pressure that may then exist by reason of said excessive rise of the fluid level in the drainage disposal system.

The foregoing and other objects of the invention are attained by the provision of a housing with a valve gate chamber and a pump compartment communicating with inlet and outlet pipe openings. The valve gate is slidably mounted within the valve gate chamber for intermittent movements for closing and opening a communicating opening between the valve gate chamber and the pump compartment and for closing the communication between the inlet and outlet pipe openings. A motor driven pump is mounted within the pump compartment with its intake opening communicating with the pump compartment and its discharge opening communicating with the valve gate chamber. The mechanism for operating the valve gate includes: a worm rotatably mounted for coupling the motor and pump shafts together and for driving a worm gear that is mounted between a pair of friction discs that are keyed to a crank shaft, adjustable spring and nut for exerting pressure by the friction discs on the worm gear, a double acting pawl with projections for engaging teeth on opposite sides of the gate stem for intermittently moving the gate to closed and open positions pivoted on the shaft crank, a spring for controlling the operation of the pawl, a micro electric switch for controlling the operation of the pump, an electric solenoid for controlling the operation of the pawl spring and the motor switch, electrode means responsive to a rise or fall of the fluid level in the valve gate chamber for energizing the solenoid coil and certain components for completing the electrical circuits involved.

A further important object of the invention is in the combined pawl and ratchet mechanism for the intermittent movement of the valve gate to the closed and the open positions, wherein said movements are limited to their closed and open positions by the limited number of teeth on the gate stem embodied with the gate wherein a pawl projection reciprocates in idleness against a smooth portion of said gate stem after the last tooth in the series has been passed by a pawl projection.

Still another important feature of the invention is the embodiment of a spring against the valve gate stem which tends to limit movements of the gate in either direction to those movements forced by the pawl projections. The use of a pawl and ratchet mechanism driven by a pump for intermittently moving a valve gate as automatic steps in an operative cycle of the pump and for limiting the steps to their closed and open positions is original in this invention and has not heretofore been made use of.

To explain further features and objects of this invention, and to familiarize those skilled in the art with the manner of constructing and utilizing this invention in accordance with the principles involved, a description in connection with the accompanying drawing is given of a preferred embodiment of the invention.

In the drawing:

Figure 1 is a front elevational view of a flood control valve device embodying this invention, shown reduced in size.

Figure 2 is a similar view of the unit shown in Figure 1, on a slightly larger scale, having its cover for the protection of mechanism on the upper portion of the unit removed and the near walls of the lower portion of the unit cut away for exposing the inner mechanism of the unit.

Figure 3 is a sectional view taken substantially on a line 3—3, Figure 2, showing a lever and associated parts operated by a solenoid.

Figure 4 is a fragmentary elevational view showing a portion of the right side of the gate stem with its teeth on the opposite sides of this stem for engaging projections of the pawl, taken substantially on line 4—4, Figure 2.

And Figure 5 is a wiring diagram showing the connections for the electrical components of the unit.

In all of these figures the unit is shown to be in a normally idle condition and in readiness for the initiation of an automatic operative cycle when drainage in the valve gate chamber is forced above a predetermined level by a reverse flow from a drainage disposal system.

Referring now more in detail to the several figures of the drawing 6 is a valve housing enclosing a valve gate chamber 7, which has an outlet pipe 8 providing an opening 9 from the chamber, and this housing also encloses a pump compartment 10 which has an outlet pipe 11 providing an opening 12 from the compartment. A partition 13 separates the valve gate chamber from the pump compartment and this partition has two openings therein, one opening 14 in the lower portion thereof forming an aperture communicating between the gate chamber and the pump compartment. One opening in the upper portion of the partition, not shown, forming a port valve communicating with the pump discharge pipe. A plate 15 is secured to the upper portion of the housing 6 by a plurality of screws such as 16 threaded into housing projections 17. Between plate 15 and the top of the valve housing 6 is inserted a continuous rubber packing strip 18 which provides an airtight joint between the plate 15 and the top of the housing 6. A pump 20 is mounted in the compartment 10 and to the underside of the plate 15 by bolts 19. Said pump 20 has an intake opening at 21 and a discharge outlet 21a, and a discharge hose 22 is attached to the pump outlet and communicates through a hose connection 23 and one of the openings in the partition 13 with the upper portion of the gate chamber 7. Said hose connection 23 has a supporting flange thereon and is mounted by bolt 24 to the housing 6. A flexible flap 25 is secured to the partition 13 by bolt 99. This flap is suitably supported and constructed of flexible material so that it will permit the discharge of drainage into the gate chamber 7 behind the main valve but will prevent a reverse flow, that is it prevents the drainage from entering the discharge hose 22 from the gate chamber 7.

Mounted to the plate 15 in the upper part of the gate chamber 7, by bolts 26, is a guide 27 for a gate stem 28. Secured at the lower end of said stem 28 is a projection 30, secured to and extending from a gate 31. Said projection 30 is secured to the stem 28 by a bolt 32. A pair of projections 33 extending horizontally from said gate 31, serves to guide the gate against the vertical surface of the partition 13 in the gate chamber. Adjacent the lower end of the guide 27 is assembled a packing 100 which can be adjusted, by a packing nut 29, for preventing the escape of drainage along the guide from the gate chamber 7.

The upper end of the pump propeller shaft 34 is coupled to the lower end of the motor shaft 35 by a rotatable worm that is hidden from view by its mating worm gear 37. Said gear 37 is compressed between two friction discs 38 and their corresponding flanges 39. Said flanges 39 are keyed to a crank shaft 40. A spring 41 and a nut 42 serve to adjust the pressure of the friction discs 38 against the sides of the worm gear 37. The shaft 40 is suitably journalled in projections 43 and 44 of a motor mounting bracket 45, said bracket being secured to the plate 15 by bolts 46. The bracket 45 has a third projection 47 through which a projection 48 from the lower end bell of the motor 36 passes as indicated by the dotted lines 48, said end bell projection is secured in the projection 47 by suitable set-screws not shown. Assembled to the upper end of the pump shaft 34 is a packing 97, said packing 97 being adjustable by a nut 49 adjacent said plate 15 for preventing the escape of drainage from the pump chamber around the rotating impeller shaft 34.

The end of the shaft 40 carries an eccentric crank projection 49a, shown by dotted lines, that pivots into a double acting pawl 50, said pawl 50 carries a pair of projections 51 and 52, shown in Figure 4, arranged to engage teeth on opposite sides of the upper portion of the gate stem 28, under the influence of a spring 53, shown in Figure 3, that fits loosely into a notch in the top of the pawl 50 as shown by the dotted lines 54 at the right end of the spring. The left end of said spring 53 is secured to the bracket 45 by pins or screws 55. The spring 53 is formed to influence the pawl projection 51 into engagement with teeth 56 and a smooth portion 57 of the upper portion of the gate stem 28, as shown in Figure 4, when the unit is normally idle or the gate is on its way to an open position.

The worm mounted on the upper end of the pump shaft 34 and its mating gear 37 provide a speed reduction gearing for driving the mechanism for moving the valve gate 31 to its closed or its open positions.

An electrode 58 is mounted within the gate chamber 7, by insulators 59 and 60. The electrode 58 carries a terminal 61 at its upper end which is connected by a conductor 62 to a terminal 63 of an energizing coil 64 of a solenoid 65, shown by Figure 3. Said solenoid 65 is mounted to the plate 15 by angles such as 66 and pins or rivets such as 67. An armature 68 of the solenoid 65 is connected by a pin 69 to a lever 70 which has a notch 71 through which the spring 53 passes and this lever 70 is pivoted by the shaft 40 for deflecting the spring 53 in response to a movement of the solenoid armature 68. The lateral end of the lever 70 is slotted to permit its free movement on the pin 69.

A micro switch 72 is pivoted by a pin 73 to an upright post 74 which projects from the bracket 45, shown by Figure 2. A micro switch is common to those skilled in the art and is known to have a body with an operating lever 75 attached thereto, the operating lever normally springing away from the body and closing the switch within the body and closing an electric circuit used therewith. The switch body 72 has its upward extending operating lever 75 pivotally or resiliently attached to its lower right hand edge portion and said lever 75 is contacted by the top of the gate stem 28, so as to maintain the switch in open circuit relation, during the final upward movement of the gate stem 28, and between operative cycles of the unit. A lever 76 and a rod 77 connect the micro switch 72 to the pin 69 of the solenoid armature 68, therefore any movement of the armature 68 will move the body 72 of the micro switch around the pivot 73 substantially to a position as shown by the dotted lines 78, Figure 2, thereby this movement of the body 72 away from the lever 75, allows the operating lever 75 to remain in the position shown by solid lines, the movement closes the switch and the open circuit through the switch 72 and initiating an operative cycle of the pump motor. Said circuit is shown in Figure 5. As is commonly known, the operating lever 75 always springs outwardly if released and when in the outward position the circuit is closed by the switch released within the switch body 72.

In the wiring diagram, Figure 5, of the drawing, 79 is the hot terminal and 80 the grounded terminal of a power supply source and when the level of fluid in the gate chamber 7 rises so as to ground the lower end of the electrode 58, the following circuit is completed: Terminal 79, conductor 81, terminal 82, conductor 83, terminal 84, solenoid coil 64, conductor 62, terminal 61, and electrode 58 to ground. The closing of this circuit energizes the solenoid coil 64 thereby moving the solenoid armature 68 downwardly which, through the connecting rod 77 connected therewith, moves the switch body 72 to a position shown by the dotted lines 78, Figure 2. Said movement of the body 72 away from the operating lever 75 permits the operating lever 75 to normally close the following circuit for a complete operative cycle of the unit terminal 79, conductor 81, terminal 82, conductor 85, terminal 86, switch blade 72, terminal 87, motor stator 88 and motor rotor 89, terminal 90, conductor 91 and grounded supply terminal 80, thereby operating the pump 20 which through worm gear 37 and its mating worm rotates the crank shaft 40 so as to give the projections 51 and 52 on the pawl 50 a vertical reciprocating movement with respect to the gate stem 28.

During inoperative periods of the unit the spring 53 is formed to deflect the pawl projection 51 into contact with the gate stem 28, as shown in Figure 4. The downward movement of the solenoid armature 68 moves the lever 70 so as to deflect the spring 53 in a direction to force the reciprocating pawl projection 52 against the side 92 and into the teeth 93 of the gate stem 28, and this engagement of the projection 52 with the teeth 93 moves the gate 31 in progressive steps to its closed position. When the closed position of the gate 31 has been reached the pawl projection 52 reciprocates in idleness against the smooth portion 94 of the gate stem 28, the closing movement of the gate 31 is limited to a distance above the bottom of the gate chamber 7 by the arrangement of the ratchet teeth 93 in the gate operating stem 28 wherein the reciprocating pawl projection 52 engages the top ratchet tooth on its respective side of the gate operating stem 28 and then reciprocates in idleness against said gate stem during the pumping period of an operating cycle of the unit and also during the time that the fluid in the gate chamber 7 covers the electrode 58.

When the level of the drainage in the gate chamber 7 recedes below the lower end of the electrode 58 the electrode circuit is opened through the solenoid coil 64 thereby deenergizing the solenoid and permitting the spring 53 to force the armature 68, the switch body 72 and the pawl projections 51 and 52 to return to their normal positions, in which position, the pawl projection 51 is brought into engagement with teeth 56 on the opposite side of the gate stem 28; this position of the switch body 72 causes the operating lever 75 to remain in the path of the up moving top 57 of the gate stem 28 where the said lever 75 can be engaged by said top 57 and moved toward the body 72 to open the motor electric circuit which has been maintained normally closed up to this time by the spring operating lever 75 tending to move away from the body 72 since initiation of the present operating cycle.

The gate 31 is limited to its positive open position by the arrangement of the ratchet teeth 56 in its respective side of the gate operating stem 28, by engagement of the reciprocating pawl projection 51 with the lowermost tooth on its respective side of said gate stem when the final step of the opening movement of the gate is actuated and during this final opening step of the gate, the top portion of the gate stem 28 engages the operating lever 75 pivoted to the lower edge of the switch body 72, which switch maintains the motor electrical circuit normally closed during complete cycles of operation except when operating lever 75 is moved counterclockwise relative to the switch body 72 by engagement of the gate stem 57 with the operating lever 75. The pressing of said switch operating lever 75 counterclockwise against the body 72 effects a relative movement between the lever 75 and the switch body 72 and this opens the electrical circuit through the motor 36. The pawl projection 51 then reciprocates in idleness against the smooth respective side 57 of said gate stem only until the motor 36 stops rotating and terminates the operative cycle of the unit.

The worm gear 37, as herein before mentioned, is mounted between a pair of friction discs 39 and a pair of flanges 38 that are keyed to the crank shaft 40. The pressure of the friction discs 39 on the gear 37 can be predetermined by adjusting the nut 42 on the crank shaft against the spring 41 and this arrangement provides a slip clutch that permits the gear 37 to rotate between the friction discs 39 in the event that the gate 31 becomes jammed or blocked in its closing movement thereby preventing damage to the teeth of the worm gear 37 by its mating worm, which is being driven by the powerful motor of the pump.

A spring 95 is secured to the plate 15 by one of the bolts 16, shown by Figure 2, so as to give some added resistance to the movement of the gate stem 28. This resistance prevents the stem 28 from moving up or down except under the force exerted by the pawl projections 51 and 52. A cover 96 for protecting the mechanism mounted upon the upper side of the plate 15, may be constructed of thin sheet metal with perforated sides for ventilating the operating pump motor 36. The impeller 98 of the pump 20 carries a projection 96 that extends through the intake opening 21 of the pump and rotates with this impeller 98 for the purpose of disintegrating solids in the drainage that might be of nature that might tend to block the passage through the by-pass.

What is claimed:

1. A valve drive system associated with a pipe, which includes: main valve means; pawl and ratchet means for positively closing and opening said main valve means; a by-pass passageway communicating with opposite sides of said main valve means; pump means for forcing material through said passageway; and a source of power connected to the pump and by speed reducing means and clutch means to the valve actuating means.

2. A valve drive system associated with a pipe, which includes: main valve means; pawl and ratchet means for positively closing and opening said main valve means; spring friction means for maintaining said main valve in its closed and opened positions; a by-pass passageway communicating with opposite sides of said main valve means; pump means for forcing material through said passag way and a source of power connected to the pump and by speed reducing means to the valve actuating means.

References Cited in the file of this patent

UNITED STATES PATENTS

| | | |
|---|---|---|
| 1,178,193 | Trimbey | Apr. 4, 1916 |
| 1,575,008 | Rubin | Mar. 2, 1928 |
| 1,786,878 | Van Keuren | Dec. 30, 1930 |
| 2,347,544 | De Costa et al. | Apr. 25, 1944 |
| 2,431,640 | Gordon | Nov. 25, 1947 |
| 2,549,204 | Kaddatz | Apr. 17, 1951 |
| 2,918,876 | Howe | Dec. 29, 1959 |

FOREIGN PATENTS

| | | |
|---|---|---|
| 584,395 | Great Britain | Jan. 14, 1947 |